July 25, 1939.  W. L. DOLLE  2,167,609
MACHINE SLIDEWAY
Filed March 4, 1938  2 Sheets-Sheet 1
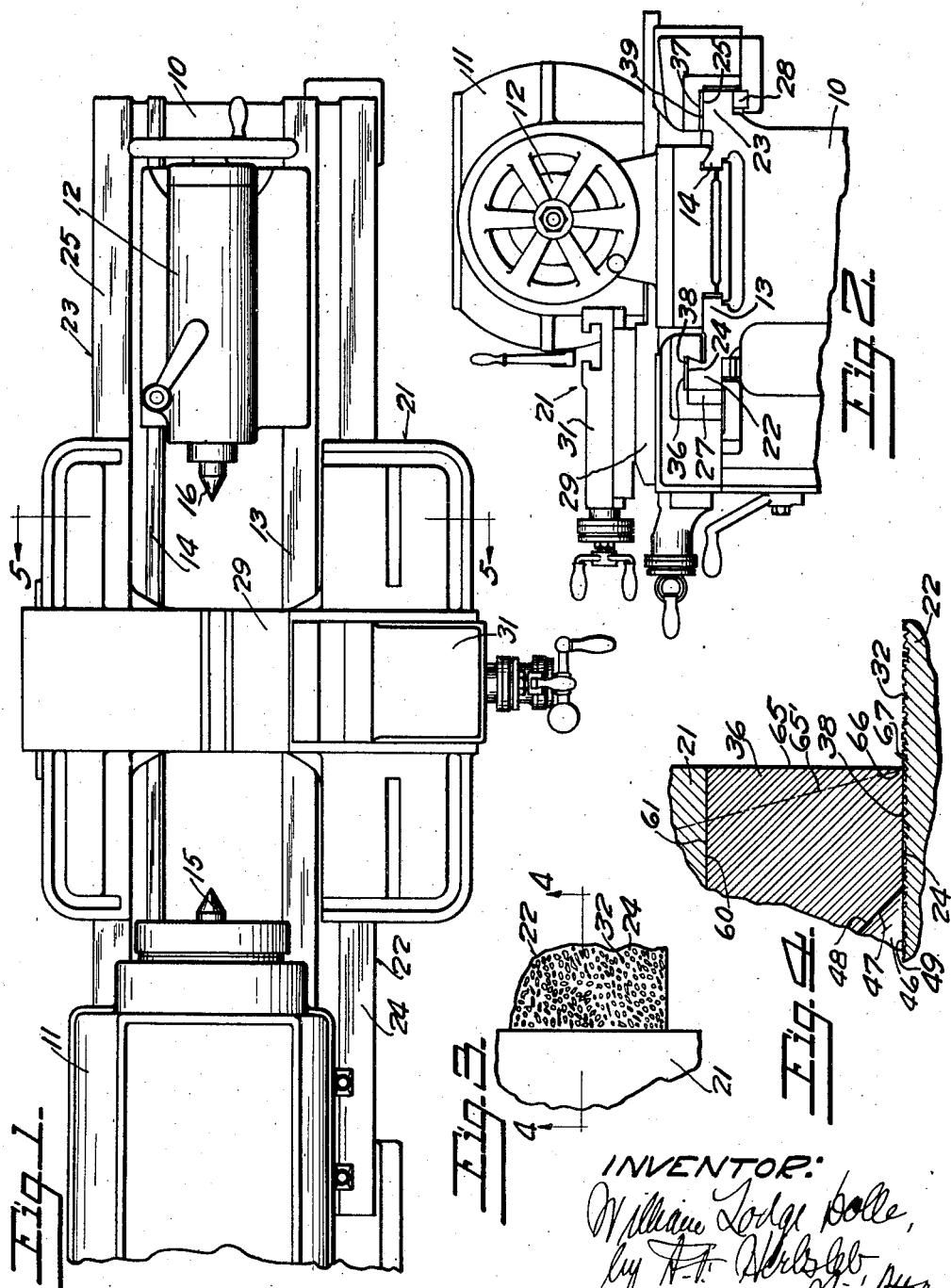
INVENTOR:
William Lodge Dolle,
by [signature]
His Attorney.

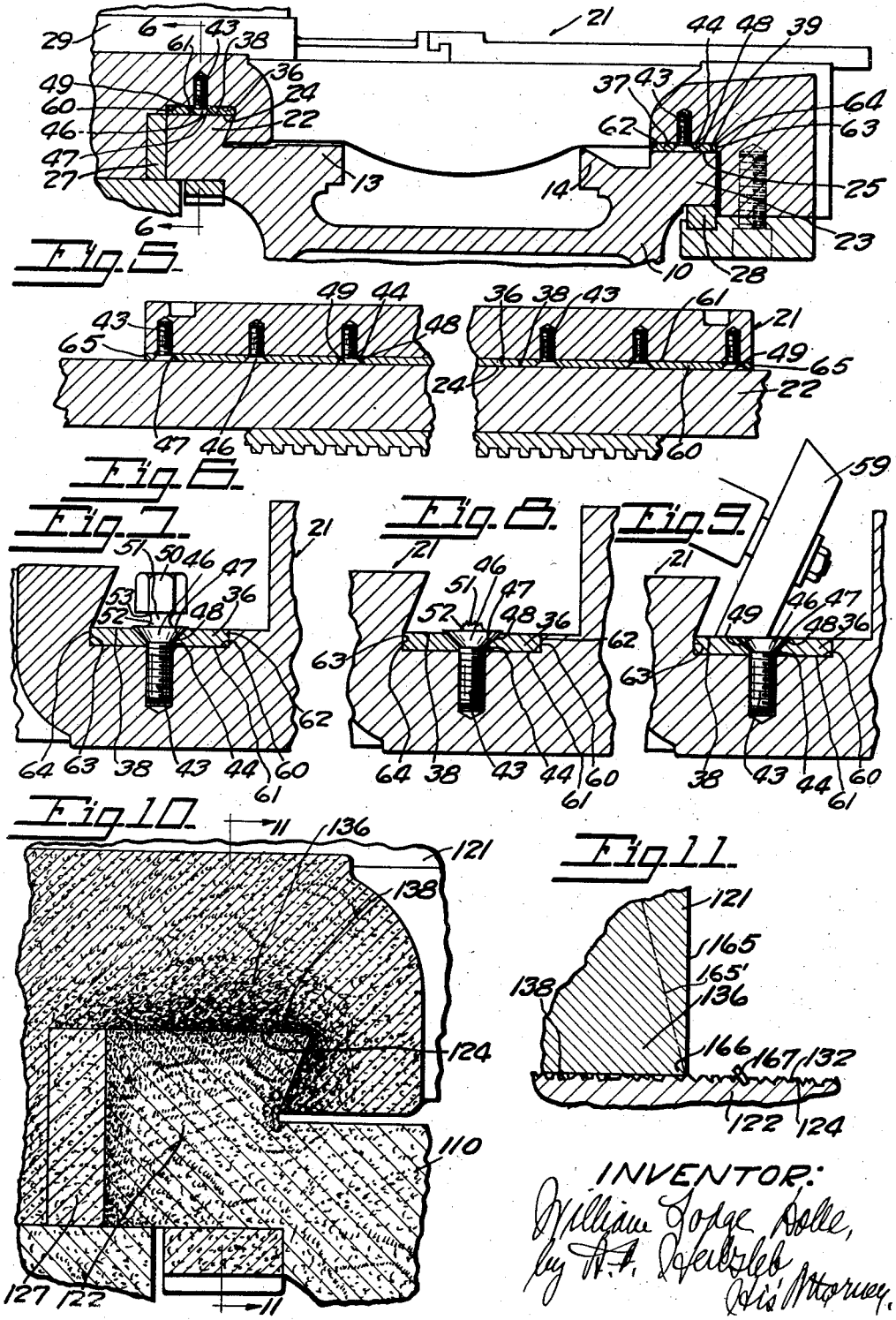

Patented July 25, 1939

2,167,609

UNITED STATES PATENT OFFICE 2,167,609

MACHINE SLIDEWAY

William Lodge Dolle, Cincinnati, Ohio, assignor to The Lodge & Shipley Machine Tool Company, Cincinnati, Ohio, a corporation of Ohio Application March 4, 1938, Serial No. 193,953

16 Claims. (Cl. 82—32)

My invention relates to slideways for guiding and supporting the movable member, such as the slide, carriage or table, of a machine in sliding relation on the relatively stationary member, as the bed of the machine.

It has heretofore been proposed to provide the stationary member or bed of such machines with attached hardened guideways to slidingly support the slide, table or carriage of the machine. Such guideways have customarily been very long, being of a length equal to the width of the supported slide, table or carriage plus the length of travel of the same. It has heretofore been attempted to harden such guideways to extreme hardness, but owing to their lengths, such hardening has usually resulted in such warping and distortion of the guideways as to make the same impracticable, unsatisfactory and extremely expensive. Such hardening also made the guideways brittle and subject to cracking and spalling, and as they were in exposed positions, they were subjected to injury from falling tools and work pieces which quickly chipped, cracked or otherwise marred the slide surfaces of the guideways and quickly impaired the accuracy and efficiency thereof and of the slideways with which they coacted.

It is the object of my invention to obviate these difficulties by the provision of a new and improved slideway between the slide, carriage or table, or supported member, of a machine, and the bed, base or supporting member thereof, that is highly resistant to wear and economical to manufacture.

My invention consists in providing the movable supported member with a novel slideway which is extremely hard; further, in providing a supporting guideway which has an exposed portion normally protected by said supported member and constructed to have distortion thereof corrected by said supported member; further, to construct such supporting guideway of a hardness which is less than the hardness of the supported slideway and is resistant to cracking, spalling, galling and injury by falling tools and work pieces and other objects, and in backing said supporting guideway by material which is still softer and which is shock absorbent to aid in preventing injury to said supporting guideway, and, further, in providing the supported slideway with cutting ends to cut and clear chips and the like from the supporting guideway and to shave bulging inequalities which may be produced in the supporting guideway, and thereby to prevent galling of the ways and to prolong the life and accuracy of the same.

My invention consists, further, in providing novel securing means for my improved slideway; further, in providing securing means which become part of the sliding surface of the slideway; further, in providing a hardened slideway and hardened securing means therefor so constructed and connected as to form an uninterrupted hardened slide surface; further, in forming a slideway and a securing means therefor of such hardness in their guiding planes as to be too hard to have sliding surfaces applied thereto by a tool having a cutting edge, and in applying such sliding surfaces by grinding, as by means of an emery wheel.

My invention consists, further, in providing slideways that have improved lubricating properties, and are arranged to clear themselves of chips, inequalities and foreign substances in novel manner.

My invention will be further readily understood from the following description and claims, and from the drawings, in which latter:

Fig. 1 is a plan view of a lathe embodying my invention, partly broken away.

Fig. 2 is an end view of the same, partly broken away.

Fig. 3 is a heroically enlarged fragmentary plan view illustrating my invention.

Fig. 4 is a cross-section of the same, taken on the line 4—4 of Fig. 3.

Fig. 5 is a vertical cross-sectional view, taken on the line 5—5 of Fig. 1.

Fig. 6 is a longitudinal vertical sectional view of the same, taken on the line 6—6 of Fig. 5.

Fig. 7 is an enlarged cross-sectional detail view, taken on the line 5—5 of Fig. 1, showing the parts in upside down relation, and showing the form of screw used to fasten the hardened wear strip to the carriage, with its turning head in place.

Fig. 8 is a similar view, but showing the turning head removed.

Fig. 9 is a similar view showing the method of finishing the exposed end of the screw to make it an uninterrupted part of the slide surface of the slideway.

Fig. 10 is a heroically enlarged fragmentary cross-section of a modification of my improved device, partly broken away, and Fig. 11 is a cross-section of the same, taken on the line 11—11 of Fig. 10, and partly broken away.

Although the present invention is shown embodied in a lathe, between the bed and carriage thereof, it is obvious that it is equally applicable to other metal working or similar machines in which a member is adapted to slide relatively to another member and to be supported and guided thereby. In a lathe, to which my invention is especially adapted, the usual cross-slide, tail stock and compound rest may also be provided with slideways made in accordance with my invention.

A metal turning lathe is shown comprising a support or bed 10, a headstock 11 and a tailstock 12 arranged in usual manner. The tailstock may be adjusted along and be clamped in suitable manner to guides 13, 14 on the bed. The work is supported by and is rotatable between centers 15, 16.

A slide shown as a carriage 21, which carries the tool or tools to cut the work supported between the lathe centers, is slidably mounted on the bed and supported and guided in its movements therealong by front and rear guideways 22 and 23, shown as having horizontally arranged flat supporting slide faces 24, 25. The guideways 22, 23 are shown formed integral with the bed and of the same material, which is preferably cast iron, or the like. Gibs 27, 28 adjustable in any well known manner are provided on the carriage to cooperate with the guideways 22 and 23 respectively, to provide the proper guiding connection between the carriage and said guideways. A usual cross slide is represented at 29 and a usual compound rest at 31.

To secure a longer lasting supporting guideway, I prefer to chill the bed casting in the parts at and adjacent to the guideways thereon to refine the crystalline structure of the metal, preferably gray cast iron, and to impart thereto a degree of hardness in excess of that present in the rest of the bed casting. Since the remaining portions of the bed remain softer and more resistant to cracking, they provide an effective cushioning support for the harder guideways and counteract any tendency toward distortion or cracking of the same.

The guideways 22, 23 are preferably sufficiently hard at and adjacent to their surface portions to be extremely wear resistant but not so hard as to be brittle, and they will sustain the blows of heavy objects dropped thereon without cracking or spalling and will be resistant to all forms of shock encountered in operation.

The casting is chilled from its slide faces inwardly, making the riding surfaces of said guideways very hard and wear resistant, the hardness penetrating into the casting a substantial distance, instanced as in a range of one inch to three inches, the hardness decreasing as the distance of penetration increases, and the hardened portion gradually merging into the unhardened body of the casting, the harder portions being cushioned by the less hard portions therebelow. The slideway surfaces 24, 25 may be applied to the guideways 22 and 23 by a tool having a cutting edge or by grinding with an emery tool, or by both such tools.

The slideway being formed direct on the casting of the bed or support is provided with small pores 32 or interstices in the casting and which form pockets for the lubricant supplied in suitable manner to the slideway. The mouths of these pores or interstices are presented upwardly so as to retain the lubricant for aiding in continued lubrication of the slide faces.

The slide, instanced as the carriage 21, is provided with hardened slideways coacting with the guideways 22, 23. In the preferred form of my invention these slideways are shown as wear plates or strips 36, 37, but they may be formed directly in the material of the slide, which may be a casting, provided with a hardened cross-sectional portion integral with the casting for each of the slideways, exemplified in the modification shown in Figs. 10 and 11.

In the preferred form of my invention, exemplified in Figs. 3 to 9 inclusive, the wear plates or strips 36, 37 are provided with flat supported slide faces 38, 39 to cooperate with the supporting slide faces 24, 25 of the guideways 21, 22 on the bed. These wear strips are preferably made of steel and hardened to a very high degree by heat treatment or otherwise or they may be made of a very hard wear resistant ferrous alloy. They are fastened to the carriage by screws 43 passing through holes 44 in the wear strips and threaded into the carriage.

As an example, it may be stated that the wear strips may be composed of or be provided with a slide contacting layer of steel suitable for case hardening and provided with a hardened shell or case by any suitable hardening method such as carbonizing, carburizing, nitriding or other method, and suitably heated in the presence of the hardening agent for a suitable length of time, and suitably quenched, to produce a slide surface of extreme hardness, or the wear strips may be composed of a suitable extremely hard wear resistant ferrous alloy, as steel containing a desired percentage of carbon, suitably heat treated and quenched, or other hardening agent, such as nickel, chromium, var dium or other hardening substance, to produce a ferrous alloy which is extremely hard throughout its structure.

The screws are provided with shouldered heads 46 having shoulders 47 thereon, shown frusto-conical, which coact with similarly formed shouldered walls 48 of the holes 44. The screws are preferably provided with an extremely hardened wear resistant slide surface 49 at their outer ends having wear resistant properties similar to those of the slide surface of the wear strip which they fasten to their foundation, instanced as the carriage 21. To accomplish this the screws are preferably formed of an extremely hard wear resistant ferrous alloy, the hardness of which extends throughout the thickness of the screw, especially in the plane of the bearing surface of the wear strip which they secure.

As an example, it may be stated that the screws are composed of a suitable extremely hard wear resistant ferrous alloy, as steel containing a desired percentage of carbon, suitably heat treated and quenched, or other hardening agent, such as nickel, chromium, vanadium or other hardening substance, to produce a ferrous alloy which is extremely hard throughout its structure, the screws being preferably of a hardness throughout their structure or in the plane in which the hardened slide face is afterwards applied at its end, similar to the hardness of the slide face with which the slide strip is provided.

In order to provide clamping action of the screw sufficient to fix the wear strip to its foundation and to be able to provide the screw with a continuous slide surface at its outer end continuous with the slide surface of the wear strip which it fixes in place, the screw is provided with a turning head 50 which is partable from the shank of the screw, as by providing the screw with a reduced portion or partable section 51 integral therewith between the shouldered head 46 and the turning head 50. This parting section is preferably distanced from the outer edge of the shouldered head and is sufficiently resistant to torsional strains to enable the wear strip to be clamped to its foundation with great force to rigidly fix the wear strip to its foundation, as by a suitable wrench applied to the turning head.

After the wear strip is so secured, the turning head is removed, as by torsional rupture of the reduced portion or shank 51 at a point distanced outwardly from the plane of the slide surface of the wear strip, as by continued turning stress applied to the head by the wrench. To insure that the rupture takes place at the proper point, the part of smallest diameter of the reduced shank connects with the shouldered head by means of a fillet 52 surrounding said shank, and with the turning head 50 by means of a fillet 53 surrounding said shank so as to locate the point of fracture of the screw between said fillets when removing the turning head. When the screw is in place, the outer end of the shouldered head 46 is preferably outside the level of the finished slide surface of the wear plate or strip which it secures in place, (Figs. 7, 8 and 9), this protruding portion of the shouldered head being removed when the screw is provided with its slide surface 49 (Fig. 9).

If desired, both the slide strip and the outer ends of the screws securing the same to its foundation may be subjected to a finishing operation by continuous passage or passages thereacross by the grinding tool to produce the continuous slide surface (Fig. 9).

When the turning head has been removed, the outer end of the screw is provided with its slide surface 49 (Fig. 9) in the plane of the slide surface of the slide strip. The screw has no slot and no depression in said plane, its end surface being uninterrupted throughout its thickness, and the outer margin of its end merging with the slide surface of the slide strip, to form a continuous uninterrupted slide surface throughout the extent of the slide strip.

The screw is preferably formed of a metal too hard to have a slide surface applied thereto by a tool having a cutting edge, and said slide surface is preferably applied by means of grinding, as by means of a rotating grinding wheel 59, which removes the broken stub of the shank 51 of the screw remaining after removal of the turning head and reduces the outer end of the screw to provide it with a hardened slide end in the plane of the slide surface of the slide strip. This latter slide surface may be provided as a continuous operation with the grinding of the outer end of the screw, or may be provided wholly or partially previous to such grinding of the outer end of the screw.

The wear strips are preferably made of a material, or have a hardened case at their wearing surface, too hard to have a wear surface applied thereto by a tool having a cutting edge. The wear or slide surface is preferably applied to the slide strip by means of grinding, as by means of a rotating grinding wheel, as the grinding wheel 59, to provide the slide strip with a highly finished smooth wear surface which is extremely hard and resistant to wear and is presented downwardly for protection against falling objects. It is firmly and evenly supported at its back, as by having its rear face ground to form a backing face 60, which is intimately supported throughout its extent by a similarly shaped backing face 61 on the support, foundation or machine part to which the slide strip is secured. The body of the support, foundation or machine part may be of the usual hardness of the material, such as cast iron, of which it is composed. The edges 62, 63 of the slide strip may be similarly ground to coact with the edge walls of the groove 64 in which the slide strip is exemplified as located.

The supporting face 61 is in alinement with the guideways 22, 23, and the backing face 60 and slide face 38 or 39 on the slide strip are in alinement with each other and with the axes of the centers which support the work, so as to insure accurate coaction between the tool or tools on the carriage or slide and the work between said centers.

As shown in Fig. 4, the slide faces of the wear strips respectively meet the preferably vertical end faces 65 at the respective ends thereof to form sharp cutting edges indicated at 66. These cutting edges act as wipers to keep the guides free of chips and particles of metal or abrasive dust in an efficient manner and make the use of other wiping means unnecessary, although such other wiping means may be employed in addition to relieve the shearing edges 66 of duty. Since the wear plates are of extremely hard steel and are provided with end faces perpendicular or acutely angularly disposed with relation to the riding surfaces of the slideways, they have a cutting action on any fine metal particles 67 that may be partly imbedded in the bed ways or caught in the pores of the metal and act to shear off the protruding portions of such particles or to force them bodily out of the ways, thus clearing the guideway surfaces of such particles and preventing them from getting between the carriage ways and the ways on the bed where they might score or damage either or both surfaces.

In the modification exemplified in Figs. 10 and 11, in which the parts are designated by similar reference numerals raised to the series 100, the extremely hardened supported slide surface 138 of the supported slideway on the slide or carriage, instead of being on a separate wear plate or strip, as in Figs. 3 to 9 inclusive, is formed directly on the casting of the slide or carriage. Such hardening may be obtained in suitable manner, for instance, chilling, as explained in connection with the hardening of the supporting guideway on the bed, supplemented by additional hardening treatment to produce an extremely hard slide surface on the slide. Such extremely hardened slide surface of the slide may be obtained either as supplemental to the hardening by chilling or as an independent hardening.

Such hardening may be obtained by case hardening, carbonizing, carburizing, nitriding or other method, depending on the material of which the slide or its slide portion is composed, or such material may be a ferrous alloy, as explained in connection with the hardening of the wear strips 36, 37. Such hardening may also be obtained by so-called flame hardening or torch hardening, and when such latter character of hardening is employed, the casting of the slide or the portion thereof on which the supported slideway is formed is preferably of steel or a cast iron having high steel content.

In such flame hardening or torch hardening there is a feeding movement between the flame and the work, either or both of which may be moved relatively to the other to procure progressive action of the flame on the supported slideway. During such application of the flame to the work, the material of the work, that is, the slideway portion of the slide or carriage, is heated to the critical range of temperature desired for obtaining the proper degree of hardening, before applying the quenching medium, the latter being usually applied immediately after the heating according to the hardness desired.

The quenching medium is usually air or water, water being used on water hardening steels or high steel content cast iron, and compressed air being used on such steels or high content steel cast iron as would ordinarily require an oil quenching, the quenching medium, its volume, the duration of its application and its pressure depending on the nature of the material being hardened and the degree of hardness desired.

In this modification the supported slide face, as 138, is formed directly on the portion of the slide on which the supported slideway, as 136, is formed, as, for instance, being a part of the casting or body thereof, or a portion separate therefrom suitably secured thereto. The hardening of the slideway may be obtained by other means or methods than that herein stated in order to obtain a hardening of the supported slide substantially harder than the hardness of the supporting slideway, one of which is exemplified at 122, which latter is in all respects similar to the hardness of the supporting slideways 22, 23 in the preferred form of my invention. If the supported slideway is part of the casting or body of the slide or carriage, the hardening preferably extends into the material of which the slide or carriage is composed, the hardness penetrating into the casting or body a substantial distance, instanced as in a range of one to three inches, as in the case of the supporting slideway, the hardness decreasing as the distance of penetration increases, and the hardened portion gradually merging into the unhardened portion of the casting, the harder portions being cushioned by the less hard portions more distanced from the supported slide surface.

The hardness imparted to the supported slideway is preferably such that it is too hard to have a wear surface applied thereto by a tool having a cutting edge. The wear or slide surface is preferably supplied to the supported slideway by means of grinding, as by means of a rotating grinding wheel, such as the grinding wheel 59.

In this modification each end of the slide face 138 of the supported slideway meets the preferably vertical end face 165 of the slide portion on which the supported slideway is formed to form a sharp hardened cutting edge 166. These cutting edges act not only as wipers to keep the supporting guides free of chips and particles of metal or abrasive dust, but they also cut obstructions and bulges to maintain the supporting slide surface throughout in its proper supporting plane, as hereinbefore explained with reference to the cutting edges 66 on the respective ends of the wear strips 36, 37. The functions, operations and forms of the hardened supported slide surfaces 138 are the same as explained with reference to the very hard slide strips 38, 39.

The relation of extremely hardened supported slide surfaces 38 and 138 to the supporting slide surfaces 24, 25 and 124, respectively, and the operative effects between the same, are such that in the course of time the friction between the coacting slide surfaces burnishes the cast metal so as to produce a hard glazing thereon for aiding in the sliding properties between the slideways while retaining the presence of the pores for sliding in the lubrication thereof.

As an example of the relative hardness of the slide surfaces 38, 39, 138 on the slide or carriage and the slide surfaces 24, 25, 124 on the support or bed, it may be stated that the slide surfaces 38, 39, 138 and the cutting edges 66, 166 at the respective ends thereof, as well as the outer slide ends of the clamping screws, preferably have a degree of hardness approximating a range of values of 85 to 90 on the Shore Scleroscope, and approximating a range of values of C–62 to 65 by the Rockwell hardness test, and the slide surfaces 24, 25, 124 preferably have a degree of hardness approximating a range of values of 35 to 38 on the Shore Scleroscope and approximating a range of values of C–25 to 28 by the Rockwell hardness test, although the latter slide surfaces may if desired be left unhardened.

This example is not to be taken as a limitation because it is obvious that the hardness of the slide surfaces 38, 39, 138 and the cutting edges 66, 166, as well as of the slide surfaces 24, 25, 124 may respectively be varied within a wide range and the difference in hardness therebetween may be maintained or may be varied as called for by changed conditions.

A decided advantage is realized in the employment of the present invention, in that, the extremely hard supported slideway surfaces, as 38, 39, 138, coact with the supporting slideway surfaces, as 24, 25, 124, to maintain the same free of chips and to dislodge any particles of foreign material that may become imbedded therein, and, furthermore, continued lubrication of the coacting slideways is assured because of the upwardly opening lubricant retaining pores 32 in the slideway surfaces of the guides on the bed.

Due to use of the extremely hardened steel slide surfaces on the carriage and their coaction with the hardened guideways of less hardness on the bed, as above described, the employment of the flat horizontally arranged supporting faces on the guideways are efficiently possible. Guideways provided with flat faces so arranged are desirable since their supporting faces are presented at substantially right angles to the downward thrust of the tool and the weight of the carriage but trouble has heretofore been encountered by the tendency of chips to lodge thereon, made harmless in my improved device.

It will be realized from the foregoing description that by securing the extremely hard wear strips 36, 37 to the under side of the carriage and locating them and the extremely hard slide faces 38, 39, 138 within the boundaries of the carriage and presenting their extremely hardened slide faces downwardly, they are protected from the blows of falling objects which would cause cracking or spalling or disfiguration of such extremely hard metal, and by forming the exposed guideways of less hard but more tenacious hardened metal they are made resistant to such cracking, spalling and disfiguration while remaining extremely wear resistant.

And, further, the metal of the ways on the bed or support, preferably chilled cast-iron, is more porous at the surface than the very hard slide strips and the very hard slide surfaces 38, 39, 138, and is adapted to retain lubricant, and since the ways of the bed or support are the longer ones of the coactive slideways, greater and better lubrication of the carriage is obtained throughout its full length of travel, lubrication being further enhanced by the fact that the open ends or mouths of the pores or interstices in the lower slideways are presented upwardly to retain the lubricant. Furthermore, the longer guideways on the bed or support are treated for less hardness than the slide ways on the slide or carriage and are therefore subject to less warping than said slideways, and the slideways on the slide or carriage so treated are shorter than the guideways on the bed or support, for which reason their tendency to warping and the extent thereof are diminished for greater accuracy of travel of the slide or carriage.

My invention is also applicable to other slide surfaces than those herein specifically described and to the gibs coacting therewith.

The guideways on the bed are maintained in their true planes and are held free of particles which might score or wear the slideways on the slide or carriage, the harder slide surfaces of the slide are protected from outside injury by reason of their protected position, and the more exposed slide surfaces on the support or bed are more resistant to injury by the blows of falling objects than the slide surface on the slide would be if exposed, and such injuries if they do take place are corrected by the cutting action of the knife edges of the harder slideways on the slide. The slideway on the support rebounds more readily without injury to the blow of an object falling thereon than would the harder slideway on the slide, if it were exposed to such blow, and if such injury does take place it usually takes the form of an indentation or crater, the walls of which are bulged above the slide surface of the supporting slideway, the protruding portions of such walls being immediately depressed or shaved off by the knife edge of the supported slideway to immediately correct such injury and restore the supporting slideway to normal condition to prevent injury to the supported sliding surface.

The cutting edges 66, 166 at the ends of the extremely hardened slideways on the slide or carriage move in close and cutting relation to the slideways on the support or bed and act to continuously remove chips and foreign substances and protrusions which may be developed in the slideway on the support or bed, and thereby prevent the entrance of foreign substances between the coacting slideways and thereby avoid scratching and marring of the slide surfaces and prevent galling of the same, and if said cutting edges become dull, they may be readily sharpened by regrinding the end faces 65, 165 at the respective ends of the slideways on the slide or carriage, whereby continued accuracy and long life of my improved device is insured. The end faces may be acutely angular to the slide faces 38 and 138 respectively, as shown by the dot and dash lines 65' and 165' in Figs. 4 and 11 respectively, to form the end cutting edges.

By my invention I have provided an extremely efficient and economical construction by arranging cooperating guiding and supporting members of different physical characteristics.

I claim:

1. In a machine of the character described, the combination of a relatively stationary supporting member and a relatively slidable supported member, a hardened slide piece on said supported member, a guideway on said supporting member of relatively less hardness than said hardened slide piece, and said hardened slide piece having an end cutting edge so disposed with relation to the surface of said guideway as to have a shearing action in its movement along said guideway on particles imbedded therein.

2. In a machine of the character described, the combination of a bed, a guideway on said bed, a carriage supported by and slidable on said guideway, a separate hardened wear strip on said carriage having a hardened slide face cooperating with said guideway, means for securing said wear strip to said carriage comprising a screw of substantially the same degree of hardness as said wear strip and extending therethrough, the outer end of said screw being provided with a hardened slide face located in the plane of said first-named slide face so as to present a substantially uninterrupted hardened surface to said guideway.

3. The combination with a carriage and a support therefor, of coacting ways between the carriage and the support comprising a downwardly presented slideway of greater hardness on the carriage, and an upwardly presented slideway of less hardness on the support on which said downwardly presented slideway rides, the slide surface of said upwardly presented slideway being of greater porosity and length than the porosity and length respectively of said downwardly presented slideway.

4. The combination with a carriage and a support therefor, of coacting ways between the carriage and the support comprising a downwardly presented slideway of greater hardness on the carriage, and an upwardly presented slideway of less hardness on the support on which said downwardly presented slideway rides, the slide surface of said upwardly presented slideway being of greater porosity and length than the porosity and length respectively of said downwardly presented slideway, and said downwardly presented slideway provided with cutting ends coacting with the outer ends of the walls of the pores in said upwardly presented slideway to clear said pores of foreign particles.

5. The combination of a support and a slide thereon, said slide provided with a hardened metal supported slide portion and having a wearing part thereon too hard to have a slide surface applied thereto by a tool having a cutting edge and provided with a hardened ground slide surface, said support provided with a coactive cast guide supporting said first-named slide surface and having a hardened finished slide surface exposing the pores of the casting to said first-named slide surface and arranged to receive and retain lubricant for said first-named slide surface.

6. The combination of a support and a slide thereon, said slide provided with a hardened metal wear portion too hard to have a slide surface applied thereto by a tool having a cutting edge and provided with a hardened ground slide surface and cutting ends at the respective ends of said surface, said support provided with a coactive cast guide supporting said first-named slide surface and having a hardened finished slide surface in which the pores of the casting are exposed to receive and retain lubricant for said first-named slide surface, and said cutting ends located to coact with the outer ends of the walls of said pores to clear foreign substances from said pores and to shear foreign substances lodged in said pores and to shear protuberances in said coactive cast guide extending above the plane of said hardened finished slide surface.

7. In a slideway for a slide, the combination of a foundation, a metal hardened wear strip too hard to have a slide surface applied thereto by a tool having a cutting edge and provided with a ground slide surface, and a threaded fastening means of substantially equal hardness with said hardened wear strip having a shouldered head in said strip and threaded into said foundation to fix said hardened wear strip to said foundation, said threaded fastening means having an uninterrupted ground slide end in the plane of said slide surface and connecting with said slide surface in manner to form an uninterrupted slide surface of the slideway.

8. In a slideway for a slide, the combination of a foundation provided with a prepared bearing surface, a hardened metal slide strip too hard to have a hardened slide surface applied thereto by a tool having a cutting edge and provided with a ground slide surface and with a prepared bearing surface coacting with said first-named prepared bearing surface, and a hardened metal threaded shank having a shoulder in said strip and threaded into said foundation to secure said hardened metal slide strip to said foundation with said prepared bearing surfaces in coactive relation for locating said ground slide surface in fixed relation to said foundation, said hardened metal threaded shank having a portion throughout its thickness at its outer end which is too hard to have a slide surface applied thereto by a tool having a cutting edge and provided with an uninterrupted ground slide surface in the plane of and in uninterrupted relation to said first-named ground slide surface.

9. In a slideway for a slide, the combination of a foundation, a hardened slide strip, and a threaded member to secure said hardened slide strip to said foundation comprising a threaded shank, a shouldered head of substantially equal hardness with said slide strip located in said slide strip and a turning head connected to said shouldered head by a weakened connection sufficiently strong to withstand the strain of threading said shank into said foundation for securing said slide strip to said foundation and partable to expose the end of said turning head for providing said end with a slide face.

10. In combination, a support provided with a guideway having a hardened supporting slide surface of a hardness in approximately a range of 35 to 38 Scleroscope and of a length to include exposed portions, and a slide having a slideway coacting with said guideway and having a hardened supported slide surface of a hardness in approximately a range of 85 to 90 scleroscope coacting with said hardened supporting slide surface and of less length than said supporting slide surface and slidable lengthwise on the latter to expose said exposed portions thereof.

11. In combination, a support provided with a guideway having an upwardly presented hardened supporting slide surface of a hardness in approximately a range of 35 to 38 Scleroscope and of a length to include upwardly exposed portions, and a slide having a supported slideway having a downwardly presented hardened supported slideway surface of a hardness in approximately a range of 85 to 90 Scleroscope coacting with said upwardly presented hardened supporting slide surface and of less length than said upwardly presented hardened supporting slide surface and slidable lengthwise on the latter to expose said exposed portions thereof.

12. In combination, a cast metal support provided with a guideway having an upwardly presented hardened supporting slide surface having open ended pores of the cast metal exposed at said hardened supporting slide surface to retain lubricant and of a length to include exposed portions, and a slide having a slideway which has a downwardly presented hardened supported slide surface of substantially greater hardness than the hardness of said supporting slide surface and of less length than said hardened supporting slide surface and slidable lengthwise on the latter to expose said exposed portions thereof, and said supported slide surface provided with cutting ends coacting with said hardened supporting slide surface to maintain the latter in its proper supporting plane.

13. In combination, a cast metal support provided with a guideway having an upwardly presented hardened supporting slide surface on the cast metal of said support of a hardness greater than the normal hardness of said cast metal and less than a hardness repelling cutting thereof by a tool having a cutting edge and having open ended pores of said cast metal exposed at said hardened supporting slide surface to retain lubricant and of a length to include exposed portions, and a slide having a slideway which has a downwardly presented hardened supported slide surface of such greater hardness than the hardness of said supporting slide surface as to repel cutting thereof by a tool having a cutting edge and to require the action of a grinding tool to finish said hardened supported slide surface and of less length than said hardened supporting slide surface and slidable lengthwise on the latter to expose said exposed portions thereof.

14. In a metal working machine, the combination of a guideway and a slide movable therealong and having a slideway coacting with said guideway, said slideway having a slide face coacting with said guideway of a hardness in approximately a range of 85 to 90 Sclereoscope.

15. In a machine of the character described, the combination of a relatively stationary member, a relatively slidable member, said relatively slidable member provided with a hardened slide surface, and a guideway on said relatively stationary member of relatively less hardness than said hardened slide surface, and said slidable member having an end cutting edge at the end of said hardened slide surface so disposed with relation to the surface of said guideway as to have a cutting action in its movement along said guideway to maintain the cross-sectional form of said guideway.

16. The combination of a slide and a support therefor, said slide and said support having coacting slideways comprising a downwardly presented slideway of substantially greater hardness on said slide and an upwardly presented slideway of less hardness on said support on which said downwardly presented slideway rides, the slide surface of said upwardly presented slideway being of greater porosity than the porosity of said downwardly presented slideway to lubricate said slideways.

WILLIAM LODGE DOLLE.